(12) United States Patent
Akif et al.

(10) Patent No.: US 11,491,949 B2
(45) Date of Patent: Nov. 8, 2022

(54) DEFORMATION STRUCTURE AND PEDESTRIAN PROTECTION DEVICE HAVING A DEFORMATION STRUCTURE

(71) Applicant: Bayerische Motoren Werke Aktiengesellschaft, Munich (DE)

(72) Inventors: Oeztzan Akif, Munich (DE); Taras Steliha, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 124 days.

(21) Appl. No.: 17/041,504

(22) PCT Filed: Feb. 14, 2019

(86) PCT No.: PCT/EP2019/053697
§ 371 (c)(1),
(2) Date: Sep. 25, 2020

(87) PCT Pub. No.: WO2019/185237
PCT Pub. Date: Oct. 3, 2019

(65) Prior Publication Data
US 2021/0009076 A1 Jan. 14, 2021

(30) Foreign Application Priority Data
Mar. 27, 2018 (DE) ............. 10 2018 204 656.5

(51) Int. Cl.
*B60R 21/34* (2011.01)
*B60R 19/18* (2006.01)
*B60R 19/00* (2006.01)

(52) U.S. Cl.
CPC ........ *B60R 21/34* (2013.01); *B60R 2019/007* (2013.01); *B60R 2019/186* (2013.01); *B60R 2021/343* (2013.01); *B60R 2021/346* (2013.01)

(58) Field of Classification Search
CPC ............. B60R 21/34; B60R 2010/186; B60R 2021/346; B60R 2021/343; B60R 2019/007; B60R 2019/186
(Continued)

(56) References Cited

U.S. PATENT DOCUMENTS 7,441,828 B2 * 10/2008 Noyori .................... B60R 19/12
296/187.04
2009/0134641 A1 5/2009 Noyori et al.
(Continued)

FOREIGN PATENT DOCUMENTS

CN 1529667 A 9/2004
CN 101445085 A 6/2009
(Continued)

OTHER PUBLICATIONS

International Search Report (PCT/ISA/210) issued in PCT Application No. PCT/EP2019/053697 dated May 3, 2019 with English translation (four (4) pages).
(Continued)

*Primary Examiner* — D Glenn Dayoan
*Assistant Examiner* — Dana D Ivey
(74) *Attorney, Agent, or Firm* — Crowell & Moring LLP

(57) ABSTRACT

A deformation structure includes at least one first layer and a second layer, which are arranged spaced apart from one another in a deformation direction and such that they can be displaced relative to one another. The first layer and the second layer have complementary protrusions and recesses, which are designed in such a way that the protrusions of the first layer and recesses of the second layer, as well as the protrusions of the second layer and recesses of the first layer can dip into one another. The first layer and the second layer are connected to one another via deformable web elements in such a way that, with a high impulse in the deformation
(Continued)

direction, the protrusions of the first layer dip into recesses of the second layer, and protrusions of the second layer dip into recesses of the first layer, such that a deformation of the deformation structure occurs at a low force level in the deformation direction, and with a low impulse in the deformation direction, the protrusions of the first layer impinge on the protrusions of the second layer such that a deformation of the deformation structure occurs at a high force level in the deformation direction.

11 Claims, 3 Drawing Sheets

(58) Field of Classification Search
USPC .......................................................... 293/132
See application file for complete search history.

(56) References Cited

U.S. PATENT DOCUMENTS

| | | | | |
|---|---|---|---|---|
| 2011/0309653 | A1* | 12/2011 | Schuler | B60R 19/18 296/187.03 |
| 2017/0282823 | A1 | 10/2017 | Akif et al. | |
| 2019/0016295 | A1 | 1/2019 | Naderer et al. | |

FOREIGN PATENT DOCUMENTS

| | | |
|---|---|---|
| CN | 104760265 A | 7/2015 |
| CN | 107074176 A | 8/2017 |
| DE | 20 2009 016 759 U1 | 5/2010 |
| DE | 10 2010 054 641 A1 | 6/2012 |
| DE | 10 2012 112 636 A1 | 7/2014 |
| DE | 10 2015 207 610 A1 | 6/2016 |
| DE | 10 2016 204 264 A1 | 9/2017 |
| JP | 2004-26120 A | 1/2004 |

OTHER PUBLICATIONS

German-language Written Opinion (PCT/ISA/237) issued in PCT Application No. PCT/EP2019/053697 dated May 3, 2019 (five (5) pages).

German-language Search Report issued in German Application No. 10 2018 204 656.5 dated Jan. 15, 2019 with partial English translation (14 pages).

English translation of Chinese-language Office Action issued in Chinese Application No. 201980021012.3 dated Jan. 30, 2022 (three (3) pages).

* cited by examiner

DEFORMATION STRUCTURE AND PEDESTRIAN PROTECTION DEVICE HAVING A DEFORMATION STRUCTURE

BACKGROUND AND SUMMARY OF THE INVENTION

The present invention relates to a deformation structure and to a pedestrian protection device having a deformation structure which is arranged between a body outer skin element and a body member element.

A known front end of a motor vehicle has for example a bumper crossmember, which is fastened to front ends of longitudinal members, and a bumper fascia, wherein a soft foam which is deformable at a comparatively low load level is arranged between the bumper fascia and the bumper crossmember in order to protect pedestrians. On account of pedestrian protection, the soft foam is arranged to protect a pedestrian possibly from a direct immediate collision with a hard, stiff structure of the motor vehicle, such as for example the bumper crossmember.

Furthermore, there is a requirement that the motor vehicle remains damage-free in the event of a collision in a very low speed range of up to for example 4 km/h in which the pedestrian protection is not relevant on account of the low speed.

Moreover, in the case of a somewhat higher speed, which is likewise still not relevant for pedestrian protection, there is a requirement that damage during a collision is as small as possible and for example a radiator structure which is situated in the front-end region is not damaged. It would be helpful for this purpose for the structure which is situated in front of the bumper crossmember to already have a sufficient capability to absorb collision energy.

The various requirements are in part in opposition to one another and require a comparatively long vehicle overhang at the vehicle front and hence a higher weight and a disadvantageous influencing of the driving dynamics.

In order to solve the thus resulting conflict of goals, DE 102010054641 A1 for example has proposed a bumper arrangement having a crossmember which is fastened to the vehicle body via crash boxes. There is formed in the direction of travel in front of the crossmember a pedestrian protection element for a soft impact of a pedestrian. Additionally provided is a pivotable energy absorption element which can be pivoted in front of the pedestrian protection element and as a result allows increased energy absorption during collisions in which a higher collision energy absorption capability of the crash structure of the motor vehicle is required.

DE 102012112636 A1 likewise shows a bumper arrangement having a bumper crossmember and a pedestrian protection element which can be switched by means of an actuator from a stiff state into a comparatively soft state which serves for pedestrian protection.

What is common to the bumper arrangements described in DE 102010054641 A1 and DE 102012112636 A1 is the fact that a crash or precrash sensor system is required therefor, with it being possible to switch on the basis of the starting signals of the sensor system between a hard, stiff state of the crash structure with high collision energy absorption capability and a soft state of the crash structure with low collision energy absorption capability of benefit for pedestrian protection.

Furthermore, DE 102016204264 A1 discloses a deformation structure of the type in question which has at least one first layer and one second layer which are arranged so as to be spaced apart from one another and displaceable with respect to one another in the deformation direction or load direction. The first layer and the second layer have complementary projections and depressions which are formed in such a way that the projections of the first layer and the depressions of the second layer and also the projections of the second layer and the depressions of the first layer can dip into one another. The first layer and the second layer are connected to one another by way of deformable web elements in such a way that, with a high impulse in the deformation direction, the projections of the first layer dip into the depressions of the second layer and also the projections of the second layer dip into the depressions of the first layer, with the result that a deformation of the deformation structure in the deformation direction occurs at a relatively low force level, and in such a way that, with a low impulse in the deformation direction, the projections of the first layer impinge on the projections of the second layer, with the result that a further deformation of the deformation structure in the deformation direction occurs at a relatively high force level.

It is the object of the present invention to provide a deformation structure and a pedestrian protection device having the deformation structure for a motor vehicle, wherein the deformation of the deformation structure occurs more reliably at the relatively high force level.

This object is achieved by a deformation structure and by a pedestrian protection device in accordance with the independent claims. Advantageous embodiments of the invention are specified in the dependent patent claims.

A deformation structure according to the invention, which can also be referred to as an energy absorption structure, has at least one first layer and one second layer which are arranged so as to be spaced apart from one another and displaceable with respect to one another in the deformation direction or load direction. The first layer and the second layer have complementary projections and depressions which are formed in such a way that the projections of the first layer and the depressions of the second layer and also the projections of the second layer and the depressions of the first layer can dip into one another. The first layer and the second layer are connected to one another by way of deformable web elements in such a way that, with a high impulse in the deformation direction, the projections of the first layer dip into the projections of the second layer and also the projections of the second layer dip into the depressions of the first layer, with the result that a deformation of the deformation structure in the deformation direction occurs at a relatively low force level, and in such a way that, with a low impulse in the deformation direction, the projections of the first layer impinge on the projections of the second layer, with the result that a further deformation of the deformation structure in the deformation direction occurs at a relatively high force level. The projection of the first layer and the projection of the second layer are designed to be complementary to one another in such a way that, with the low impulse in the deformation direction, a form fit between the projection of the first layer and the projection of the second layer occurs in the lateral direction, i.e. a direction transversely with respect to the deformation direction, that is to say a direction substantially perpendicular to the deformation direction, at least in the lateral direction.

The deformation structure is deformable at different energy levels in dependence on a load case, i.e. a collision impulse, and thus has different stiffnesses. The "switching" between the two stiffnesses occurs here automatically independently of a sensor system or an actuator. The setting of the stiffnesses is brought about here by a specific geometrically complementary configuration of the first layer and of the second layer and the connection of the layers by way of the web elements. At the low impulse, projections of opposite layers impinge on one another. The form fit between the projections reduces a probability that the first layer and the second layer are offset further from one another in the lateral direction, that is to say a direction transversely with respect to the deformation direction, i.e. a direction parallel to the extent of the layers, and that the projections of the two layers come out of engagement again and possibly result in the deformation of the deformation element occurring in an undesired manner at a low force level. According to the invention, it is accordingly ensured that the adjacent layers are mutually supported on opposite projections in a reliable manner and the further deformation of the deformation element occurs at the relatively high force level. In other words, the opposite projections, or the projections which come into an opposite position in the courses of the collision, have complementary geometries which allow a mutual form fit of the opposite projections that act in particular in the lateral direction.

According to one development of the deformation structure according to the invention, the projection of the second layer or the projection of the first layer has a depression which is adapted in such a way that the projection of the first layer—or the projection of the second layer if the depression is formed in the first layer—can engage into the depression, with the result that a movement of the first layer and of the second layer with respect to one another is inhibited at least in the lateral direction, that is to say at least impeded or even prevented.

The depression allows a form fit between the opposite projections in the lateral direction. The projection which engages into the depression of the opposite projection cannot deflect laterally if a collision force acts in the collision direction of the deformation element, since for this purpose lateral edges of the depression would have to be overcome, which in turn is made more difficult by the acting collision force. The projection which engages into the depression butts against the corresponding edge of the depression during a lateral movement.

According to a further development of the deformation structure according to the invention, the projection of the second layer and/or the projection of the first layer has/have a step which is adapted in such a way that the projection of the first layer—or the projection of the second layer if the step is formed on the first projection—can engage with the step in such a way that a movement of the first layer with respect to the second layer is inhibited at least in the lateral direction, that is to say at least impeded or even prevented.

The mode of action of the step is similar to the depression, with the step inhibiting a movement of the adjacent layers in only one lateral direction (transverse direction) whereas the aforementioned depression can also inhibit a movement in a further, in particular the opposite lateral, direction. For this purpose, the step can be configured to be sufficiently high so as to ensure that, in the case of the collision with the low impulse, the corresponding projection comes into engagement with the step of the opposite projection.

It is also possible to combine a depression and a step on a projection with one another, i.e. to form a projection with a depression additionally with a step which is higher than the edge of the depression.

According to one development, the first layer and the second layer can also be displaced in a direction parallel to one another as a result of deformation of the web elements.

In particular, the web elements can be formed in the deformation structure in such a way that they fail in a brittle and/or plastic manner with the high collision impulse and wherein the web elements act in a manner corresponding to a film hinge with the low collision impulse.

Here, the web elements formed as a film hinge can bring about a pivoting movement of the first layer and the second layer with respect to one another in which the first layer and the second layer are displaced parallel to one another and in the deformation direction, that is to say toward one another.

As a result, a defined pivoting movement of the first layer and of the second layer toward one another is possible, and the stiffness-increasing position of the first layer and of the second layer with respect to one another can be assumed in a reliable manner.

With the high collision impulse, the failure of the web elements prevents the pivoting movement of the first layer and of the second layer with respect to one another. Owing to the failure of the web elements, the first layer and the second layer are displaced toward one another only in the deformation direction substantially without lateral deflection movement.

According to a preferred development, the web elements are formed as wall elements or surface elements which extend in the width direction of the first layer and of the second layer. It is particularly possible here for the web elements to extend over an entire width of the deformation structure.

In the deformation structure according to the invention, the first layer and the second layer are preferably substantially identically formed or shaped.

This facilitates production of the deformation structure. Furthermore, complementary projections and depressions are possible in a simple manner as a result.

According to a preferred development of the deformation structure, the projections of the first layer and the depressions of the second layer and also the depressions of the first layer and the projections of the second layer are arranged opposite one another in a starting position of the deformation structure.

As a result, with a low collision impulse, the deformation structure can be deformed in the deformation direction at a relatively low force level.

The deformation structure can preferably be formed from a plastics material.

As a result, the deformation structure can be configured to be lightweight and corrosion-resistant.

Here, the deformation structure can preferably be formed in one piece.

As a result, production is simplified and a number of components is thus particularly low.

The production of the deformation structure from plastic, in particular the one-piece deformation structure, can occur for example by extrusion or by an additive manufacturing method.

As a result, the deformation structure can be produced particularly efficiently at low costs.

According to a particularly preferred development, the first layer and the second layer are in each case designed in the form of a wavy plate. Here, wave crests and wave troughs form the projections and depressions.

The projections and depressions (wave crests and wave troughs) can preferably have a trapezoidal configuration.

This geometric configuration makes it possible for the projections and depressions of the opposite layers to be readily slid into one another.

The deformation structure according to the present invention can have a plurality of layers, wherein two adjacent layers in each case form a first layer and a second layer. For example, the deformation structure can have three, four, five, six or more layers.

According to a preferred development of the deformation structure, the connecting webs are arranged in a layer interspace of two adjacent layers, and the connecting webs of two adjacent layer interspaces are oriented in opposite directions with respect to their displacement action. What is meant here by displacement action is for example a pivoting movement in opposite directions.

This is intended to achieve uniform deformation of the deformation structure having the plurality of layers with the low collision impulse.

The present invention also relates to a pedestrian protection device for a motor vehicle having a deformation structure according to the invention. Here, the deformation structure is preferably arranged between a vehicle outer skin element and a body member element.

Here, the deformation structure is supported on the body member element during a collision impulse.

The vehicle outer skin element can be a bumper fascia. The body member element can be a bumper crossmember.

The pedestrian protection device according to the invention having the deformation structure does away with the need for a collision sensor system and an actuator system in order, where appropriate, to actively lock or unlock a mechanical mechanism and thus to be able to switch as required between a structure with a "soft" deformation behavior and a "stiff" deformation behavior. The pedestrian device according to the invention having the deformation structure acts automatically dependent on a collision impulse which in turn depends on a collision speed of the motor vehicle. The deformation direction is in particular a collision direction and, in the application for pedestrian protection in the motor vehicle front, is substantially a vehicle longitudinal direction.

In principle, however, the scope of protection of the deformation structure according to the invention also extends to all other application areas in the motor vehicle sector or else to other technology fields in which deformability of a deformation structure at different load levels depending on a load case is required.

Accordingly, with the low collision impulse and thus the low collision speed of the motor vehicle, a pivoting movement of the opposite layers occurs in such a way that the projections of the opposite layers are situated opposite one another and are supported on one another. The deformation structure accordingly acts in a stiff manner. With the high collision impulse and thus the high collision speed, there occurs no pivoting movement of the opposite layers, with the result that the opposite projections and the depressions of the opposite layer can be displaced in one another. The deformation structure thus reacts more softly over a longer deformation distance.

For example, the pedestrian protection device can be designed in such a way that, with a collision impulse which is produced up to a threshold value speed of the motor vehicle, the deformation structure reacts more stiffly, and is deformed with a higher force. At the low collision speed, a collision load can thus be transferred to the body element situated behind—at a very low speed—or, in order to protect components situated behind, energy is sufficiently absorbed by the deformation structure—at a somewhat higher speed which is, however, below the threshold value speed. In each case, the repair costs can thus be reduced, wherein, in particular at the very low speed—for example in the event of what are referred to as parking prangs—the repair costs can possibly be limited to repairing paint damage, for example.

The threshold value speed can be for example 20 km/h or the like.

Furthermore, the pedestrian protection device can be designed in such a way that, with a collision impulse which is produced from and including the threshold value speed of the motor vehicle, the deformation structure reacts more softly and is deformed with a lower force. This is particularly advantageous in the case of a frontal collision of the pedestrian with the vehicle from the threshold value speed, since lower collision forces act here on the pedestrian.

Developments of the invention which are specified above can be combined with one another in any desired manner where possible and expedient.

There follows a brief description of the figures.

DETAILED DESCRIPTION OF THE DRAWINGS

Exemplary embodiments of the present invention are described below with reference to FIGS. 1 to 6.

Figure 1:
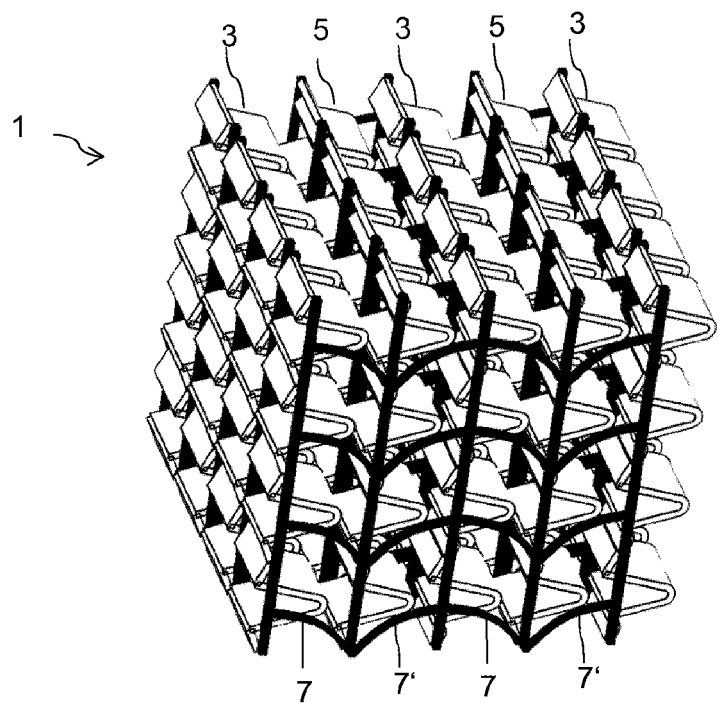
FIG. 1 schematically shows in a perspective view a deformation structure according to a first exemplary embodiment of the present invention.

FIG. 1 shows in a perspective view a deformation structure 1 according to a first exemplary embodiment of the present invention. The deformation structure 1 is mounted on a front face of a motor vehicle front end, in particular on a motor vehicle front, in front of a bumper crossmember (not shown) at the point of a known pedestrian protection foam. In particular, the deformation structure 1 is arranged in a space between a vehicle outer skin, that is to say a bumper fascia, and the bumper crossmember.

As is shown in FIG. 1, the deformation structure 1 has a series of consecutively arranged layers 3, 5, 3, 5, 3. The layers 3, 5, 3, 5, 3 are spaced apart from one another and connected to one another by way of connecting webs 7, 7' which form web elements according to the present invention.

Figure 2:
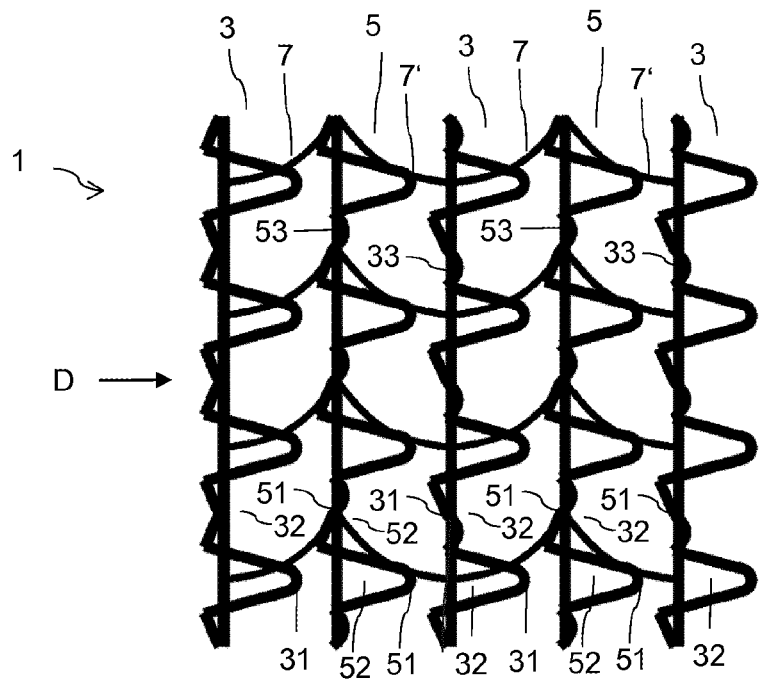
FIG. 2 schematically shows in a side view the deformation structure according to the first exemplary embodiment of the present invention.

FIG. 2 shows a side view of the deformation structure 1, wherein a deformation direction D of the deformation structure 1 runs from left to right in FIG. 2 and is illustrated by an arrow. In this case, the deformation direction D is a vehicle longitudinal direction. A vertical direction in the drawing plane can preferably correspond to a vehicle vertical direction or a vehicle transverse direction. The deformation structure 1 has its deformation function in this deformation direction. On the left side of FIG. 2 there is here in particular arranged a bumper fascia (not shown) and, on the right side, a bumper crossmember (not shown). The layers 3, 5, 3, 5, 3 have a substantially identical construction. A first layer 3 from the left consists of alternating projections 31 and depressions 32. Likewise, the second layer 5 from the left consists of alternating projections (wave crests) 51 and depressions (wave troughs) 52. This is adjoined by further layers 3, 5 and 3. Two adjacent layers 3 and 5 are arranged spaced apart from one another and connected to one another by connecting webs 7 and 7'. The connecting webs 7, 7' are designed to be deformable in the event of a load which acts in the deformation direction D. In the vehicle transverse direction, the deformation structure 1 can have a plurality of rows of connecting webs 7, 7', as can be seen in part in particular in the perspective view of FIG. 1. The projections 51, formed to the right in FIG. 2, of the layers 5 have depressions 53 at their front ends. Likewise, the projections 31, formed to the right in FIG. 2, of the layers 3 have depressions 33 at their front ends. The depressions 33, 53, formed to the right, of the layers 3, 5 have such a configuration that front ends of the projections 51 and 31, respectively, formed to the left, of the layers 5, 3 can engage into the depressions 33 and 53, respectively.

The deformation structure 1 is preferably produced from a plastics material, with the result that the deformation structure 1 can be produced cost-effectively and can be designed to be sufficiently lightweight. In particular, the deformation structure 1 can be produced in one piece by means of an additive manufacturing method or an extrusion method. Alternatively, the layers 3, 5 could also be produced separately and then be connected to one another via the webs by means of a suitable method. The webs could, for example, be extruded on subsequently.

The layers could alternatively also be produced from a metallic material, for example aluminum or an aluminum alloy, and then be connected to the webs in a further method step by means of an extrusion method.

With reference to FIGS. 3a, 3b, 4a and 4b, a function of the deformation structure 1 is illustrated for different collision load cases. In a frontal collision of the motor vehicle with an object or a person, a load, or at least a resultant of a collision load, acts in the vehicle longitudinal direction on the deformation structure 1, wherein the layers 3 are displaced in the direction of the layers 5 with deformation of the connecting webs 7, 7'. In the starting position of the deformation structure 1, which is shown in FIG. 2, the projections 31 of the layers 3 and the depressions 52 of the layers 5 and also the depressions 32 of the layers 3 and the projections 51 of the layers 5 are situated opposite one another. If the layers 3 and the layers 5 were not connected to one another by way of the connecting webs 7, 7', it would be possible from this starting position for adjoining layers 3, 5 to be displaced toward one another and in one another substantially unimpeded with only low resistance.

Figure 3A:
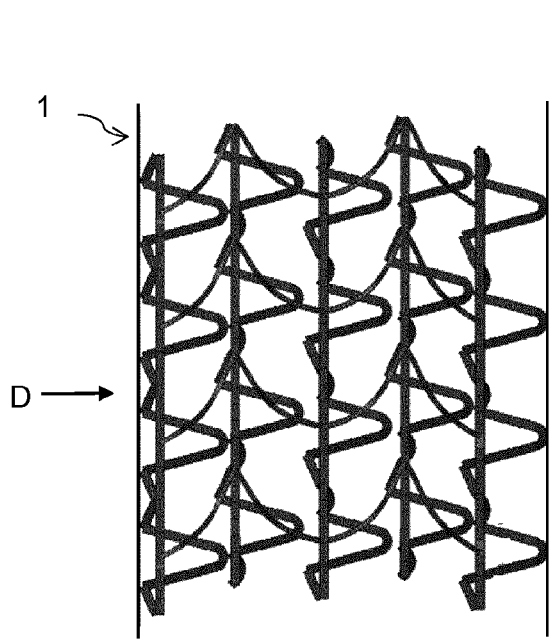
FIGS. 3a and 3b schematically show in a side view the deformation structure according to the first exemplary embodiment of the present invention in a collision load case with a low collision impulse.
Figure 3B:
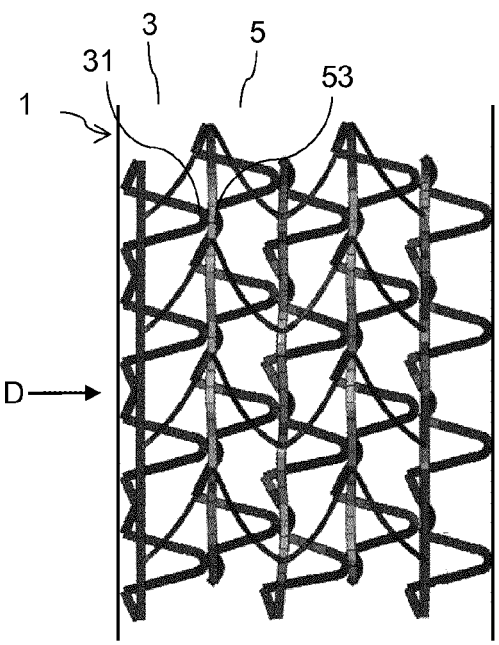
Figure 4A:
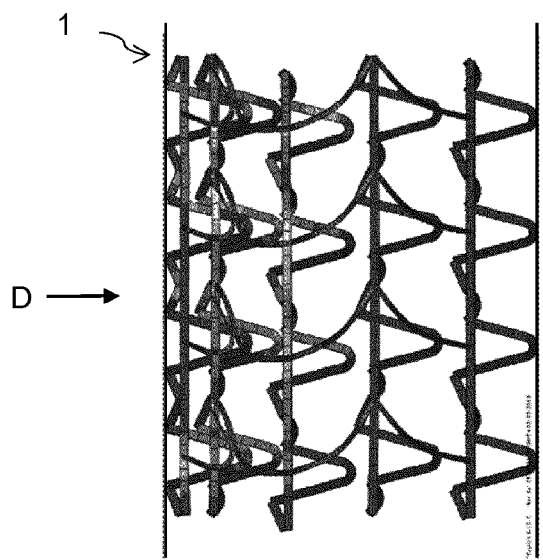
FIGS. 4a and 4b schematically show in a side view the deformation structure according to the first exemplary embodiment of the present invention in a collision load case with a high collision impulse.
Figure 4B:
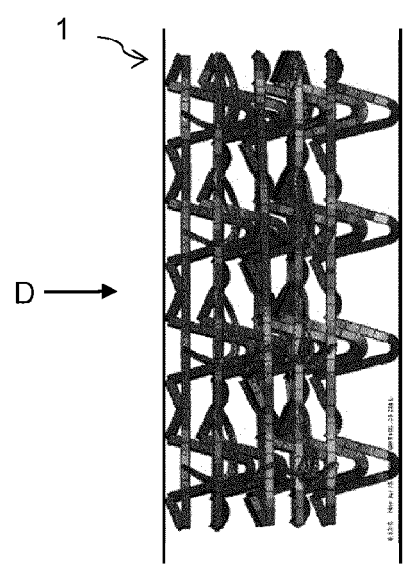

FIGS. 3a and 3b show a collision load case with a low collision impulse which takes place for example at a collision speed of the motor vehicle of under a predetermined collision speed of 20 km/h and which is less relevant for pedestrian protection. FIGS. 4a and 4b show a collision load case with a high collision impulse which takes place for example at a collision speed of the motor vehicle of equal to or above the predetermined collision speed of 20 km/h. Here, the predetermined collision speed is stated only by way of example and can also have another value.

First of all, with reference to FIGS. 3a to 3b, a function of the deformation structure 1 is described for the collision of the motor vehicle with the collision speed of less than 20 km/h.

Whereas FIG. 2 shows the state before the beginning of the deformation of the deformation structure 1, FIG. 3a finally shows a beginning deformation of the connecting webs 7, 7' under the collision load with the low collision impulse. The connecting webs 7, 7' are arranged and configured such that at the low collision impulse the adjacent layers 3, 5 undergo a pivoting movement while being pressed toward one another. Here, the connecting webs 7, 7' possibly form so-called film hinges which support the pivoting movement or define the pivoting path. With this pivoting movement there occurs, in addition to the movement toward one another, a parallel displacement of the adjacent layers 3 and 5 with respect to one another. Here, the projections 31 of the layers 3 pass into a position opposite to the projections 51 of the layers 5, as is shown in FIGS. 3a and 3b. FIGS. 3a and 3b show how the upper sides or end sides of the projections 31 of the layers 3 come into contact with the upper sides or end sides of the projections 51 of the layers 5. Here, the projections 31 and 51, which are directed to the right in the figures, dip into depressions 53 and 33, respectively, which are directed to the left in the figures. As a result, a form fit between the opposite projections of the layers 3 and 5 is produced such that a further pivoting movement or a further lateral movement of the layers 3 and 5 with respect to one another is prevented. The depressions 33 and 53 are formed in such a way that an opposite projection can easily dip into the depression. Here, an edge of the depression is designed to be higher than an opposite edge in the direction of the movement of the engaging projection. This firstly facilitates the coming into engagement of the corresponding projection with the depression and makes it more difficult for them to come out of engagement. A further deformation of the deformation structure 1 in the collision direction or deformation direction can occur, with the described engagement of the opposite projections, only with a deformation of the projections 31 and 51 that occurs with a relatively high force level. As a result, the deformation structure 1 has a relatively high stiffness in the collision speed range below about 20 km/h.

In the case of the slow collision speed, and depending on the collision load level, the deformation structure 1 thus transmits the collision load directly to a motor vehicle structure situated behind, i.e. the bumper crossmember, or the individual layers 3, 5 of the deformation structure 1 fail in a brittle manner by breaking after the projections 31, 51 impinge on one another and/or fail by plastic deformation at a higher load level than with the quicker collision speed.

In particular, the deformation structure 1 can be designed in such a way that, with collision speeds of for example less than 4 km/h, it can transmit a collision load to the crash structure without failure of the deformation elements 3. That is to say that the connecting webs 7, 7' are only elastically deformed and the structure of the layers 3 and 5 itself does not fail. This is advantageous if, in the case of so-called parking dings or the like, no damage requiring repair to the motor vehicle is intended to occur, and has an influence for example on an insurance classification of the motor vehicle.

A function of the deformation structure 1 in the event of the collision of the motor vehicle with the collision speed equal to or greater than 20 km/h is described below with reference to FIGS. 4a and 4b.

Whereas FIG. 2 shows the state before the beginning of the deformation of the deformation structure 1, FIG. 4a finally shows the beginning of deformation of the connecting webs 7, 7' with the collision load with the high collision impulse. The connecting webs 7, 7' are arranged and configured such that they fail or are more or less folded together with the high collision impulse, with the result that they cannot display a film hinge action. Here, the mass inertia of the layers 3, 5 with the high collision impulse is in particular of such size that the connecting webs 7, 7' cannot effect or support a lateral deflection movement of the layers 3 and 5. As a result, the projections 31 of the layers 3 and the depressions 52 of the layers 5 and also the projections 51 of the layers 5 and the depressions 32 of the layers 3 are moved directly toward one another. In the further course of the collision and deformation of the deformation structure 1, which is shown in FIG. 4b, the projections 31 of the layers 3 are pushed completely into the depressions 52 of the layers 5. Likewise, the projections 51 of the layers 5 are pushed completely into the depressions 32 of the layers 3. Since substantially no deformation of the structure of the layers 3 or of the layers 5 is required for this purpose, deformation of the deformation structure 1 (at least to the state shown in FIG. 4b) occurs at a relatively low force level.

This is advantageous insofar as it is important from the collision speed of approximately 20 km/h for the front face of the motor vehicle front end, and in particular the bumper fascia in conjunction with the deformation structure 1, to react sufficiently softly at a low deformation force level to protect a pedestrian. Accordingly, if the collision counterpart is a pedestrian, at a speed of approximately 20 km/h and more, a relatively low force advantageously acts on the pedestrian.

Overall, the deformation structure 1 according to the invention thus makes it possible to solve a conflict of goals which firstly allows sufficiently large stiffness of the deformation structure 1 or a sufficiently large deformation force level of the deformation structure 1 at very low collision speeds which are not relevant for pedestrian protection and ensures sufficient pedestrian protection by means of a low deformation force level at a somewhat higher collision speed which is relevant for pedestrian protection.

Figure 5:
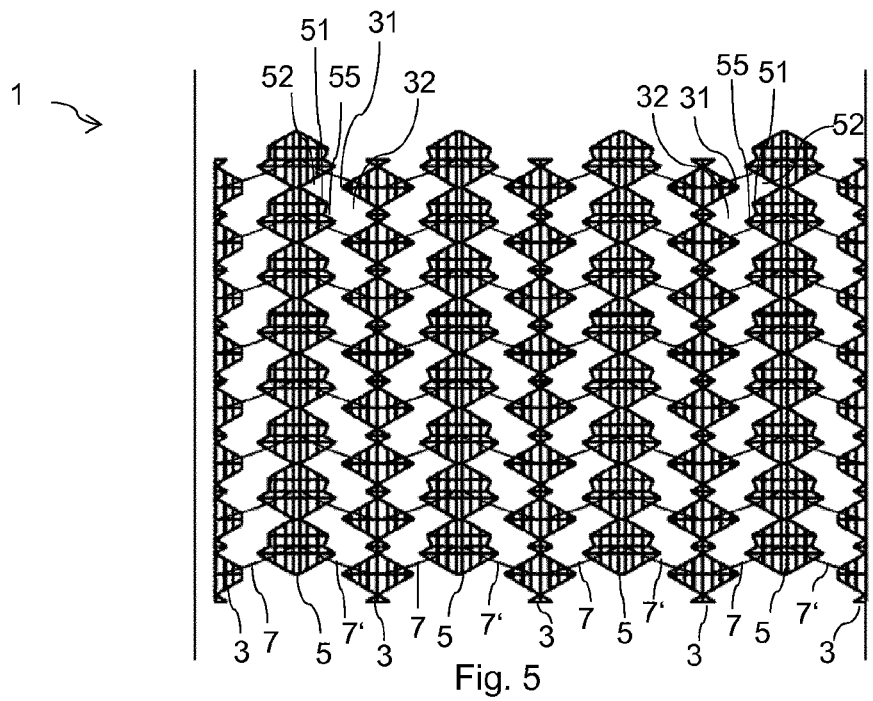
FIG. 5 schematically shows in a side view a deformation structure according to a second exemplary embodiment.
Figure 6:
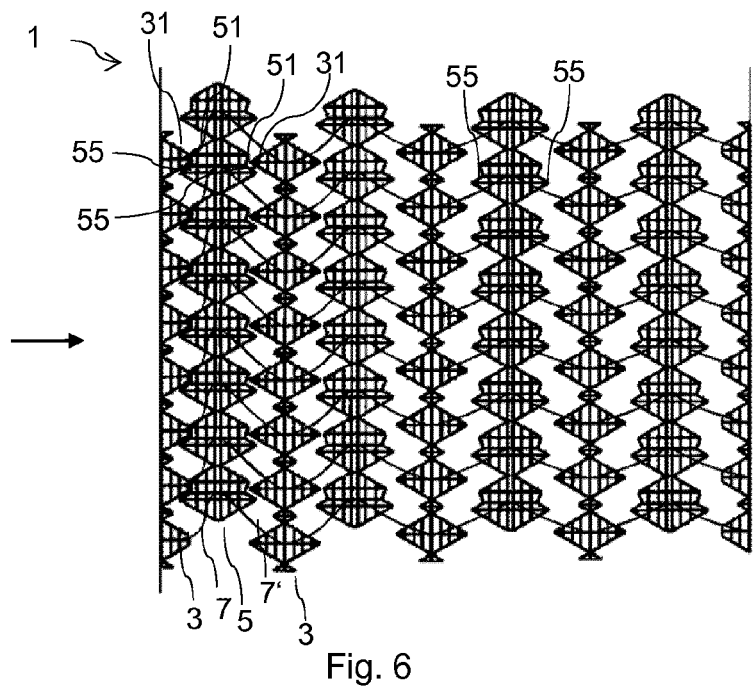
FIG. 6 schematically shows in a side view the deformation structure according to the second exemplary embodiment in a collision load case with a low collision impulse.

FIGS. 5 and 6 show a deformation structure 1 according to a second exemplary embodiment. Analogously to the first exemplary embodiment, the deformation structure 1 according to the second exemplary embodiment has alternating layers 3 and 5 which are connected to one another so as to be spaced apart from one another by means of deformable web elements 7, 7'. The layers 3 have alternating projections 31 and depressions 32. The layers 5 have alternating projections 51 and depressions 52. The projections 31 of the layers 3 are designed to be complementary to the depressions 52 of the layers 5 in such a way that they can dip into the depressions 52. The projections 51 of the layers 5 are likewise designed to be complementary to the depressions 32 of the layers 3 in such a way that they can dip into the depressions 32. The projections 51 of the layers 5 each have a step 55.

Analogously to the deformation structure 1 according to the first exemplary embodiment, the deformation structure 1 according to the second exemplary embodiment is designed to absorb a collision load D and functions in principle as has already been described with reference to the first exemplary embodiment. The collision load D in FIGS. 5 and 6 acts from left to right substantially perpendicularly to mid-planes of the layers 3 and 5. FIG. 5 shows the state of the deformation structure 1 before a deformation. FIG. 6 shows the beginning of a deformation of the deformation structure 1 by the collision load D with a relatively low collision impulse. In the case of the comparatively low collision impulse which is shown in FIG. 6, the web elements 7, 7' bring about a pivoting movement of the layers 3 and 5 with respect to one another, with the result that the projections 31 impinge on the projections 51. Here, the projections 31 impinge on the steps 55 of the projections 51, with the projections 31 coming into engagement with the steps 55. As a result, a further displacement of the layers 3 and 5 in the lateral direction, i.e. a transverse direction with respect to the deformation direction, is prevented. This ensures that the projections 31 and 51 remain in contact and the deformation structure 1 thus has the desired high stiffness.

A deformation of the deformation structure 1 by a collision load D with a relatively large collision impulse is not illustrated in the figures. Here, opposite projections 31, 51 and depressions 52, 32 dip into one another analogously to the first exemplary embodiment with a low deformation force of the deformation structure 1.

Unlike the deformation structure 1 according to the first exemplary embodiment, the layers 3 and 5 of the deformation structure 1 according to the second exemplary embodiment are not configured to be substantially identical but to be different. For example, only the projections 51 of the layers 5 have the steps 55. Here, both the projections 51 of the layers 5, which project in the right direction in FIGS. 5 and 6, and the projections 51 of the layers 5, which project in the left direction in FIGS. 5 and 6, have the steps 55. The projections 31 of the layers 3 are designed to be complementary for form-fitting engagement with the steps 55 of the projections 51 of the layers 5.

A large number of further embodiments of the layers and of the associated projections and depressions is conceivable, wherein opposite projections or projections, which come into an opposite position in the course of the collision, of adjacent layers allow a form-fitting engagement of the corresponding opposite projections.

The invention claimed is:

1. A deformation structure, comprising:
at least one first layer and one second layer which are arranged so as to be spaced apart from one another and displaceable with respect to one another in a deformation direction, wherein
the first layer and the second layer have complementary projections and depressions oriented in a same direction, which are formed such that the projections of the first layer and the depressions of the second layer and also the projections of the second layer and the depressions of the first layer can dip into one another,
the first layer and the second layer are connected to one another by way of deformable web elements such that, with a high impulse in the deformation direction, the projections of the first layer dip into the depressions of the second layer and also the projections of the second layer dip into the depressions of the first layer, with the result that a deformation of the deformation structure in the deformation direction occurs at a low force level, and, with a low impulse in the deformation direction, the projections of the first layer impinge on the projections of the second layer, with the result that a deformation of the deformation structure in the deformation direction occurs at a high force level,
the projection of the first layer and the projection of the second layer are designed to be complementary to one another such that, with the low impulse in the deformation direction, a form fit between the projection of the first layer and the projection of the second layer occurs at least in a lateral direction.

2. The deformation structure according to claim 1, wherein
the projection of the second layer or the projection of the first layer has a depression which is adapted such that the projection of the first layer or the projection of the second layer can engage into the depression, with the result that a movement of the first layer and of the second layer with respect to one another is inhibited at least in the lateral direction.

3. The deformation structure according to claim 1, wherein
the projection of the second layer and/or the projection of the first layer have a step which is adapted such that the projection of the first layer or the projection of the second layer can engage with the step such that a movement of the first layer and of the second layer with respect to one another is inhibited at least in the lateral direction.

4. The deformation structure according to claim 1, wherein
the first layer and the second layer are displaceable in a direction parallel to one another as a result of deformation of the web elements.

5. The deformation structure according to claim 1, wherein
the web elements fail in a brittle and/or plastic manner with the high collision impulse, and
the web elements act in a manner corresponding to a film hinge with the low collision impulse.

6. The deformation structure according to claim 1, wherein
the web elements are formed as wall/surface elements which extend over an entire width of the first layer and of the second layer.

7. The deformation structure according to claim 1, wherein
the projections of the first layer and the depressions of the second layer and also the depressions of the first layer and the projections of the second layer are arranged opposite one another in a starting position of the deformation structure.

8. The deformation structure according to claim 1, wherein
the deformation structure is formed in one piece from a plastics material.

9. A pedestrian protection device for a motor vehicle, comprising:
a deformation structure according to claim 1, wherein
the deformation structure is arranged between a vehicle outer skin element and a bumper crossmember.

10. A deformation structure, comprising:
at least three layers, wherein two adjacent layers in each case form a first layer and a second layer, the first layer and the second layer being arranged so as to be spaced apart from one another and displaceable with respect to one another in a deformation direction, wherein
the first layer and the second layer have complementary projections and depressions which are formed such that the projections of the first layer and the depressions of the second layer and also the projections of the second layer and the depressions of the first layer can dip into one another,
the first layer and the second layer are connected to one another by way of deformable web elements such that, with a high impulse in the deformation direction, the projections of the first layer dip into the depressions of the second layer and also the projections of the second layer dip into the depressions of the first layer, with the result that a deformation of the deformation structure in the deformation direction occurs at a low force level, and, with a low impulse in the deformation direction, the projections of the first layer impinge on the projections of the second layer, with the result that a deformation of the deformation structure in the deformation direction occurs at a high force level,
the projection of the first layer and the projection of the second layer are designed to be complementary to one another such that, with the low impulse in the deformation direction, a form fit between the projection of the first layer and the projection of the second layer occurs at least in a lateral direction.

11. The deformation structure according to claim 10, wherein
the connecting webs are arranged in a layer interspace of two adjacent layers, and
the connecting webs of two adjacent layer interspaces are oriented in opposite directions with respect to their displacement action.

* * * * *